(12) United States Patent
Hino

(10) Patent No.: US 9,104,090 B1
(45) Date of Patent: Aug. 11, 2015

(54) VIEWFINDER

(71) Applicant: Panasonic Intellectual Property Management Co., Ltd., Osaka (JP)

(72) Inventor: Masayuki Hino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/682,386

(22) Filed: Apr. 9, 2015

Related U.S. Application Data

(63) Continuation of application No. 14/325,835, filed on Jul. 8, 2014, now Pat. No. 9,031,402.

(30) Foreign Application Priority Data

Mar. 27, 2014 (JP) ................................ 2014-065195

(51) Int. Cl.
  *G03B 13/12* (2006.01)
  *G02B 23/00* (2006.01)
(52) U.S. Cl.
  CPC .............. *G03B 13/12* (2013.01); *G02B 23/145* (2013.01)
(58) Field of Classification Search
  CPC .............................. G03B 13/12; G03B 23/145
  See application file for complete search history.

(56) References Cited

U.S. PATENT DOCUMENTS

| | | | |
|---|---|---|---|
| 4,571,038 A | 2/1986 | Jako | |
| 5,485,307 A | 1/1996 | Kim | |
| 5,583,693 A | 12/1996 | Funatsu | |
| 5,621,568 A | 4/1997 | Hasushita et al. | |
| 9,031,402 B1 * | 5/2015 | Hino | ............................ 396/374 |
| 2001/0026685 A1 | 10/2001 | Shinmizu | |
| 2003/0165336 A1 | 9/2003 | Kato et al. | |
| 2004/0056970 A1 | 3/2004 | Westerweck et al. | |

FOREIGN PATENT DOCUMENTS

JP       08-139972       5/1996

OTHER PUBLICATIONS

Co-pending U.S. Appl. No. 14/325,835, filed on Jul. 8, 2014.

* cited by examiner

*Primary Examiner* — WB Perkey
(74) *Attorney, Agent, or Firm* — Renner, Otto, Boisselle & Sklar, LLP

(57) ABSTRACT

A viewfinder 3 includes a finder optical system S2 including first and second lens groups L1, L2; a zoom frame 6 provided with first and second cam grooves 63, 64 configured to rotate about an optical axis A2 to move the first and second lens groups L1, L2 in the optical axis direction in accordance with the shapes of the first and second cam grooves 63, 64; and a diopter adjuster 9 configured to adjust the diopter of the finder optical system S2. The diopter adjuster 9 changes the position of the zoom frame 6 in the optical axis direction to adjust the diopter of the finder optical system S2, and adjusts, during rotation of the zoom frame 6, the position of the zoom frame 6 in the optical axis direction such that the diopter of the finder optical system S2 is maintained.

3 Claims, 11 Drawing Sheets

REAR ←——→ FRONT

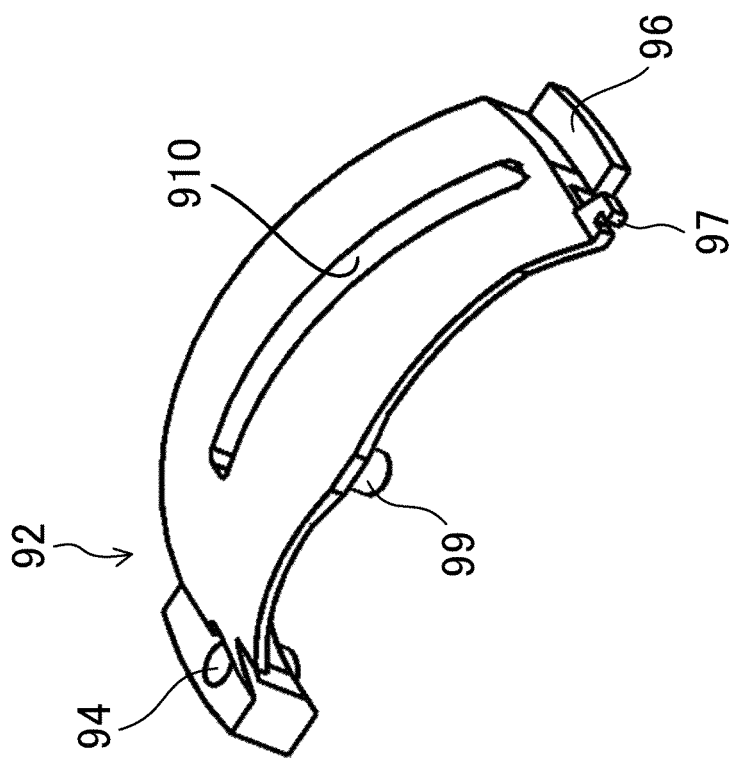
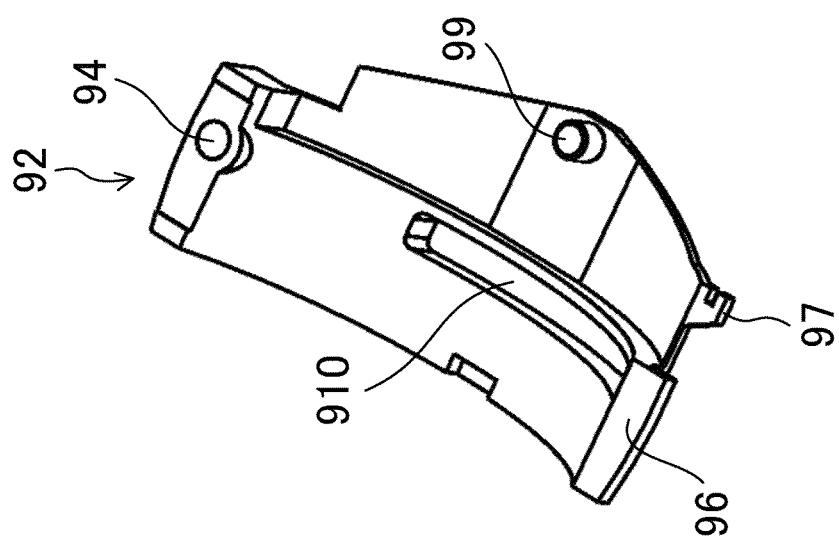

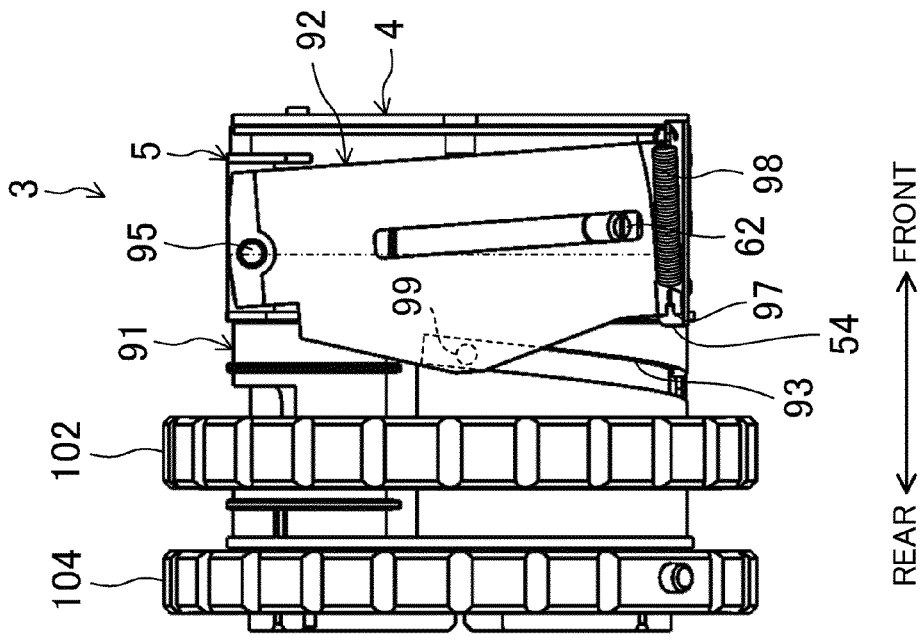
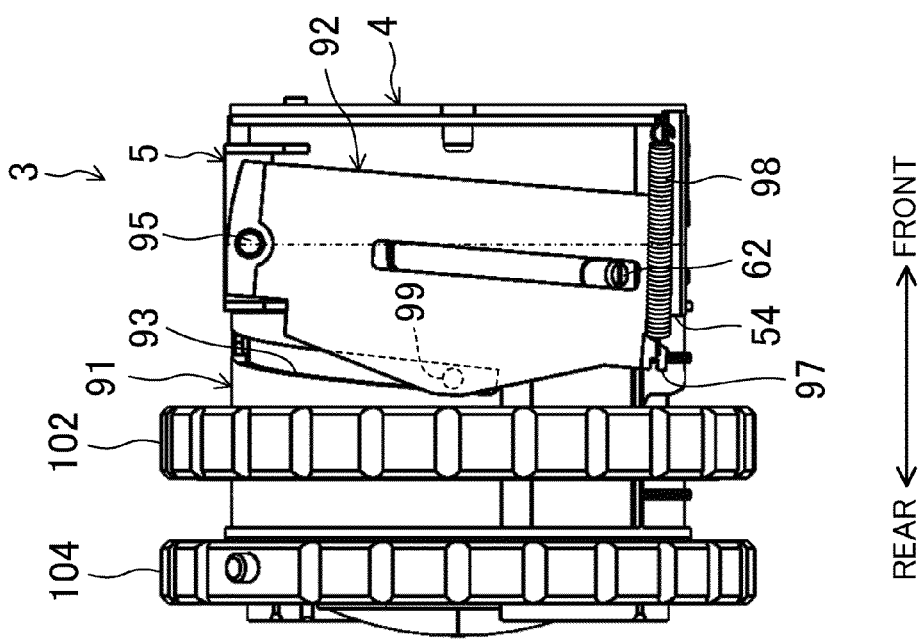

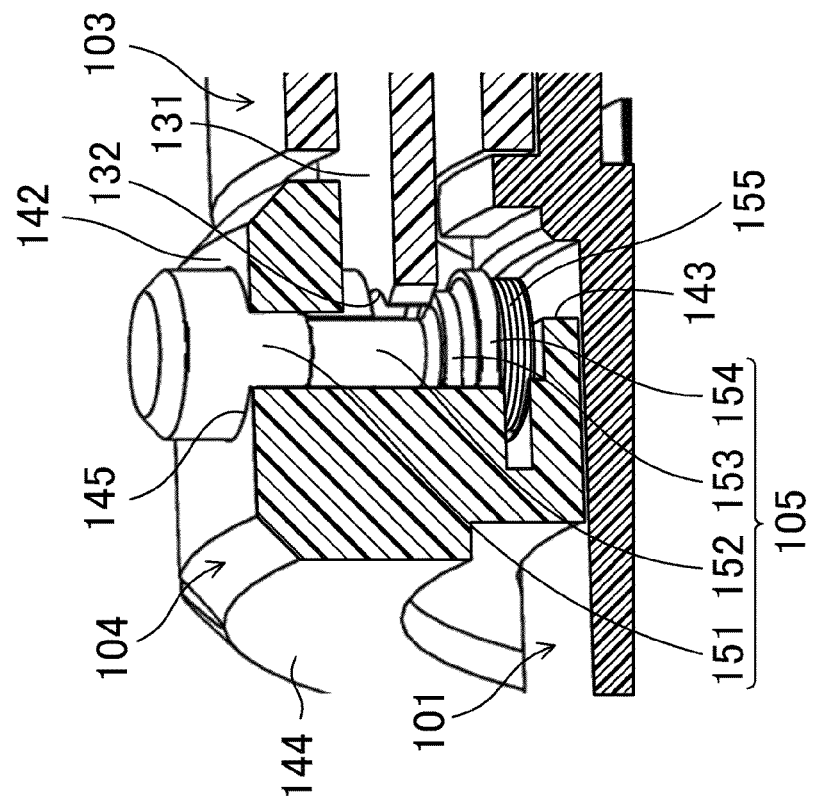
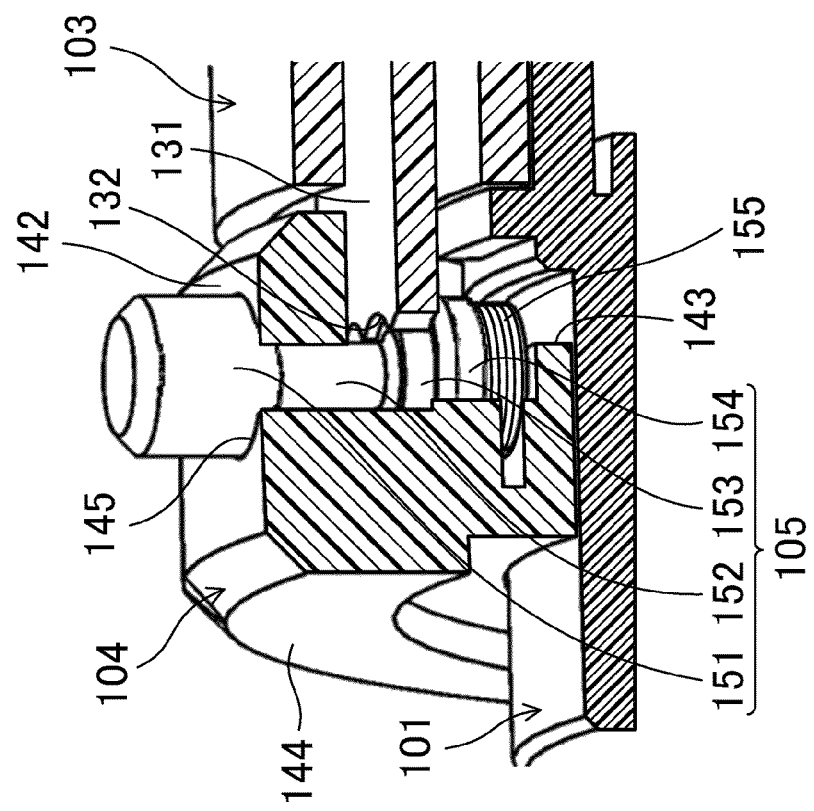

VIEWFINDER

CROSS-REFERENCE TO RELATED APPLICATION

This application claims priority to Japanese Patent Application No. 2014-065195 filed on Mar. 27, 2014, the entire disclosure of which is incorporated by reference herein.

BACKGROUND

The present disclosure relates to a viewfinder and an imaging apparatus including the viewfinder.

Conventionally, viewfinders each attached to a camera body have been known. A user can view, through the viewfinder, an object whose image is to be captured by the camera body.

For example, a viewfinder disclosed in Japanese Unexamined Patent Publication No. H08-139972 includes a display configured to display a captured image and a finder optical system used for observation of the image displayed on the display. The finder optical system includes a zoom lens configured to move in an optical axis direction of the finder optical system. A user can move the zoom lens to zoom in an image displayed on the display, and can view such a zoomed-in image.

SUMMARY

There are viewfinders capable of adjusting diopter in accordance with the visual acuity of a user. However, if the zoom lens is, after diopter adjustment, moved to zoom in or zoom out an image as in a viewfinder disclosed in Japanese Unexamined Patent Publication No. H08-139972, shift from the adjusted diopter occurs. For example, a lens(es) other than the zoom lens may be moved in order to adjust the diopter when the zoom lens is moved. However, the configuration of the viewfinder is complicated. Conversely, the diopter may be adjusted after the zoom lens has moved. However, since diopter adjustment is required every time zooming is performed, shooting steps are complicated.

The present disclosure provides a viewfinder and an imaging apparatus which are configured to reduce the change in diopter during zooming even though the diopter is adjustable.

A viewfinder disclosed herein includes a finder optical system including first and second lenses which are arranged on an optical axis and which are moved in an optical axis direction to change zoom magnification of the finder optical system; a frame body provided with a cam groove configured to guide the first and second lenses and configured to rotate about the optical axis to move the first and second lenses in the optical axis direction in accordance with a shape of the cam groove; and a diopter adjuster configured to adjust diopter of the finder optical system. The diopter adjuster changes a position of the frame body in the optical axis direction to adjust the diopter of the finder optical system, and adjusts, during rotation of the frame body, the position of the frame body in the optical axis direction such that the diopter of the finder optical system is maintained.

An imaging apparatus disclosed herein includes the viewfinder and a camera body to which the viewfinder is attached.

According to the viewfinder, the change in diopter during zooming can be reduced even though the diopter is adjustable.

Moreover, according to the imaging apparatus, the change in diopter during zooming can be reduced even though the diopter is adjustable.

BRIEF DESCRIPTION OF THE DRAWINGS

FIG. 6A is a perspective view of a guide, and FIG. 6B is a perspective view of the guide from an angle different from that of FIG. 6A.

FIGS. 7A and 7B are side views of the viewfinder from the angle at which the guide can be viewed. FIG. 7A illustrates the state in which diopter is adjusted to a far-sighted side, and FIG. 7B illustrates the state in which the diopter is adjusted to a near-sighted side.

FIG. 8A illustrates the entirety of the diopter ring, and FIG. 8B is an enlarged view of an anti-rotation pin.

FIGS. 10A and 10B are cross-sectional views of the diopter ring with the anti-rotation pin being visible. FIG. 10A illustrates the state in which the anti-rotation pin is not pressed, and FIG. 10B illustrates the state in which the anti-rotation pin is pressed.

DETAILED DESCRIPTION

An example embodiment will be described below in detail with reference to drawings.

1. ENTIRE CONFIGURATION

Figure 1:
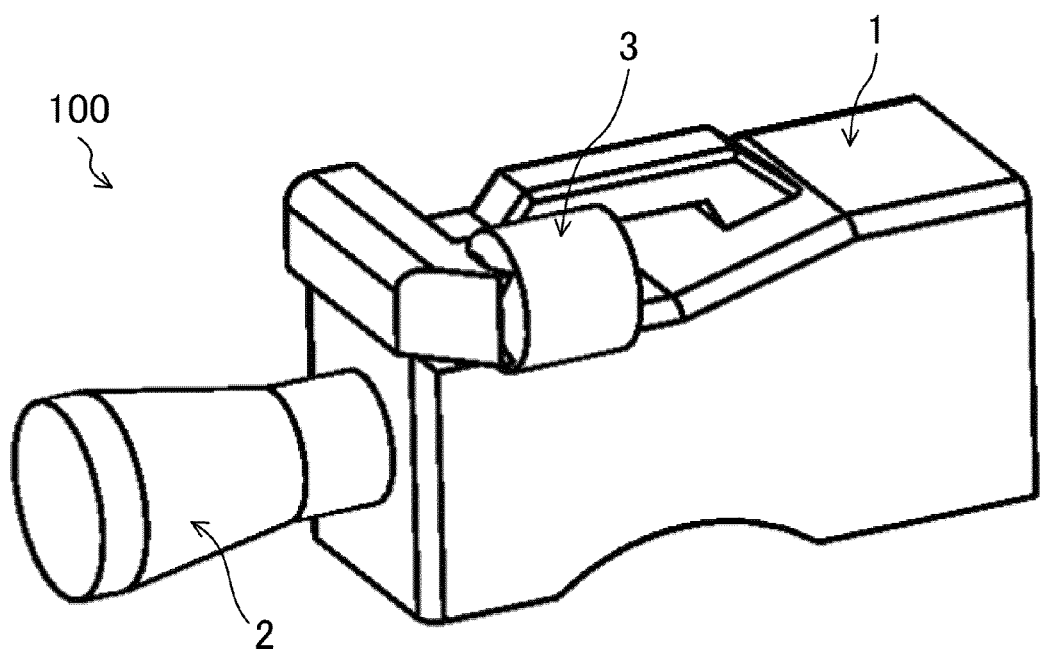
FIG. 1 is a perspective view of a video camera.
Figure 2:
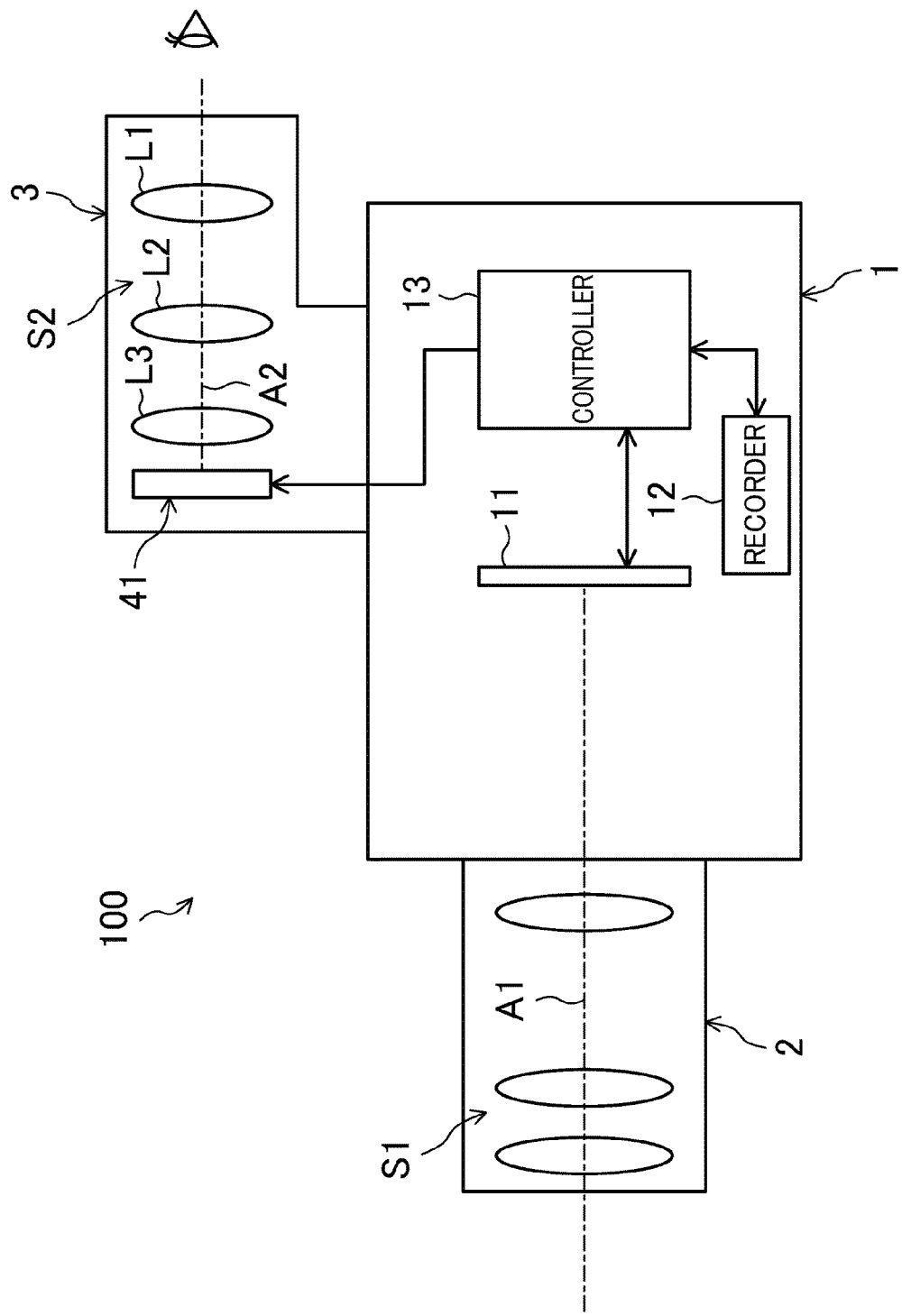
FIG. 2 is a schematic block diagram of the video camera.

FIG. 1 is a perspective view of a video camera 100, and FIG. 2 is a schematic block diagram of the video camera 100.

The video camera 100 includes a camera body 1, a lens barrel 2, and a viewfinder 3. The video camera 100 is configured to convert a captured image into digital data and record the digital data in a recorder 12. In this example, the video camera 100 is capable of capturing a high-resolution video image such as an HD video image. The video camera 100 is an example of an imaging apparatus.

The camera body 1 includes an image sensor 11, the recorder 12, and a controller 13 configured to control the entirety of the video camera 100.

The image sensor 11 is configured to convert, by photoelectric conversion, an image formed on an imaging surface into an electrical signal. The image sensor 11 is, e.g., a charge coupled device (CCD) image sensor or a complementary metal-oxide semiconductor (CMOS) image sensor. The recorder 12 is configured to record video data generated by processing of an electrical signal from the image sensor 11. The recorder 12 is, e.g., a hard disk, an optical disk, or a memory card. The controller 13 includes, e.g., a processor, and controls the entirety of the video camera 100. For example, the controller 13 causes a display 41 (described in detail later) of the viewfinder 3 to display a video image captured by the image sensor 11.

The lens barrel 2 includes a plurality of lenses arranged on an optical axis A1. The lenses form an imaging optical system S1. The imaging optical system S1 is configured to collect light from an object to form an image on the imaging surface of the image sensor 11. The lens barrel 2 includes a zoom lens, a focus lens, an image blur correction lens, etc. A user changes the positions of the zoom lens and the focus lens to adjust the magnification of an object and a focusing state of the object.

Although will be described in detail later, the viewfinder 3 at least includes the display 41 configured to display a video image captured by the image sensor 11 of the camera body 1, and a finder optical system S2 used for a user viewing the video image displayed on the display 41. A user performs shooting while viewing a video image through the viewfinder 3.

2. DETAILED CONFIGURATION OF VIEWFINDER

Figure 3:
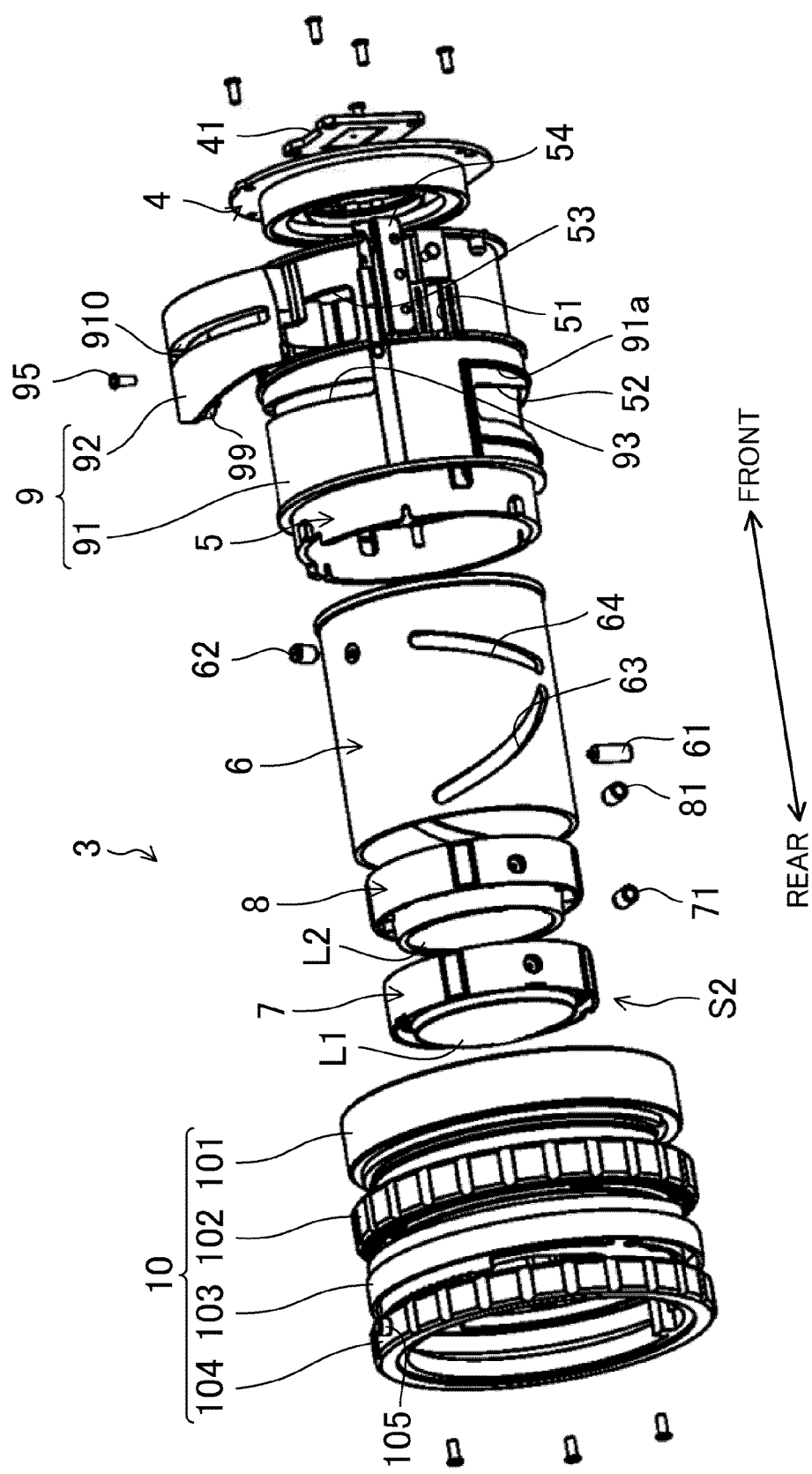
FIG. 3 is an exploded perspective view of a viewfinder.
Figure 4:
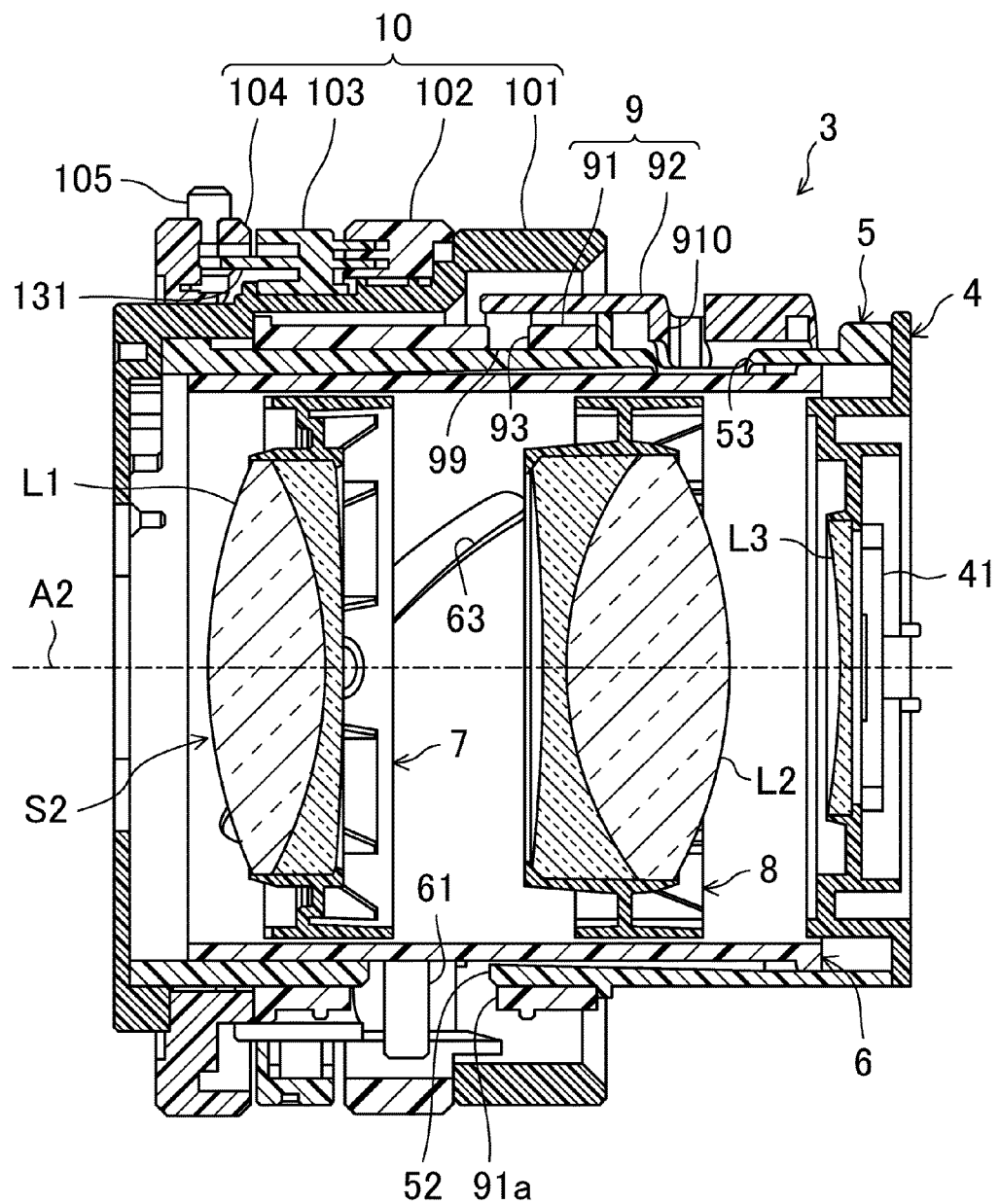
FIG. 4 is a longitudinal sectional view of the viewfinder.
Figure 5:
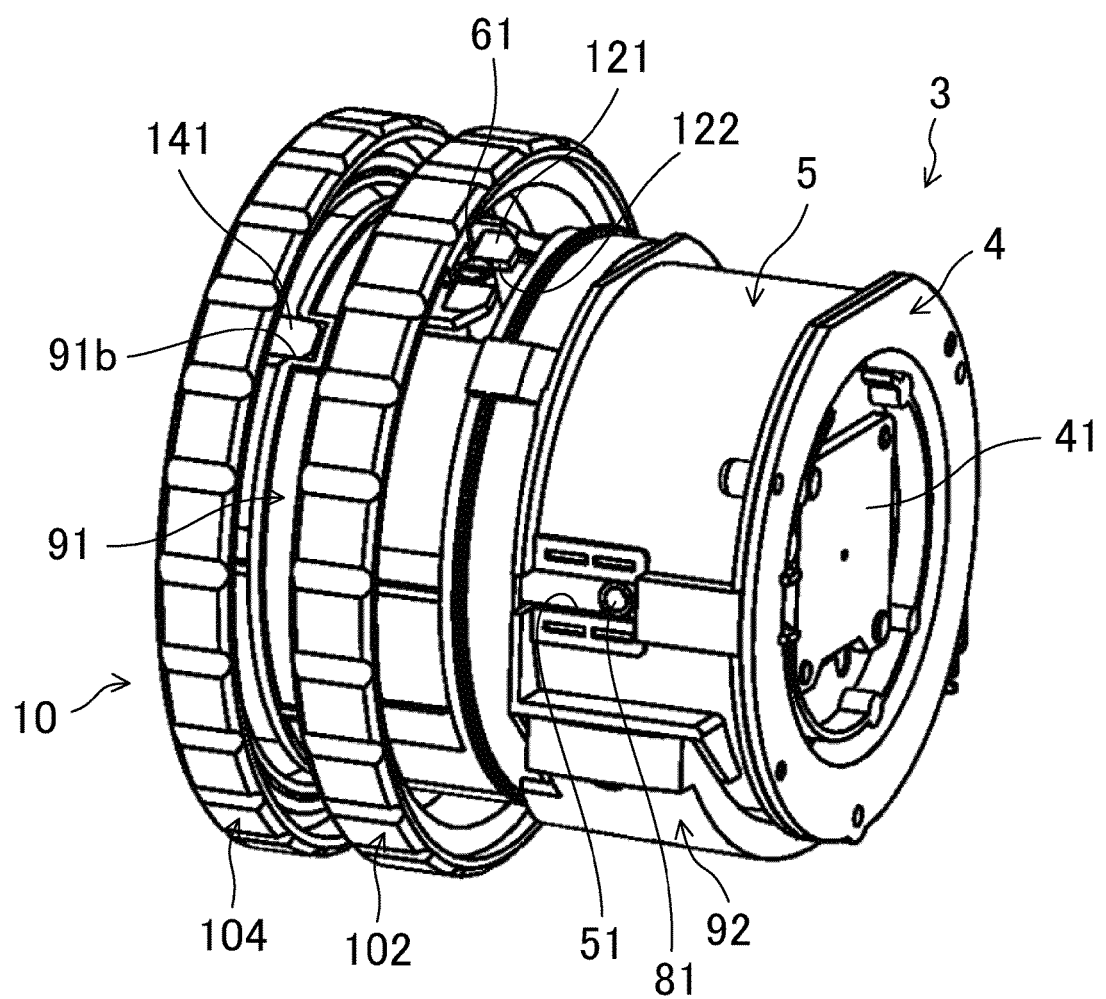
FIG. 5 is a perspective view of the viewfinder without some members of the viewfinder being illustrated.

The configuration of the viewfinder 3 will be described below in detail. FIG. 3 is an exploded perspective view of the viewfinder 3. FIG. 4 is a longitudinal sectional view of the viewfinder 3. FIG. 5 is a perspective view of the viewfinder 3 without some members of the viewfinder 3 being illustrated.

The viewfinder 3 includes a base 4, the display 41, a body frame 5, a zoom frame 6, a first-lens-group frame 7, a second-lens-group frame 8, a diopter adjuster 9, an operating part 10, and the finder optical system S2.

Unless otherwise provided, an "optical axis" refers to an optical axis A2 of the finder optical system S2, an "optical axis direction" refers to a direction along the optical axis A2 of the finder optical system S2, a "radial direction" refers to a radial direction about the optical axis A2 of the finder optical system S2, and a "circumferential direction" refers to a circumferential direction about the optical axis A2 of the finder optical system S2. Moreover, "rotation" refers, unless otherwise provided, to rotation about the optical axis A2 of the finder optical system S2.

The base 4 is provided at one end of the viewfinder 3 in the optical axis direction. An opening is formed at the center of the base 4. The display 41 and a third lens group L3 are attached to the center of the base 4. The display 41 and the third lens group L3 are arranged on the optical axis A2 of the finder optical system S2. The third lens group L3 includes a single lens. The third lens group L3 has negative refractive power. The third lens group L3 is an example of a third lens. A side close to the base 4 in the optical axis direction is hereinafter referred to as a "front," and a side opposite to the base 4 in the optical axis direction is hereinafter referred to as a "rear."

The display 41 is a liquid crystal display. The display 41 displays various types of information such as information on a video image captured by the camera body 1 and information on shooting. Note that the display 41 is not limited to the liquid crystal display, but may be an organic electro-luminescence (EL) display or a cathode ray tube (CRT) display.

The body frame 5 is a cylindrical member extending in the optical axis direction. The base 4 is attached to a front end part of the body frame 5. A plurality of linear grooves 51 extending in the optical axis direction are formed at the body frame 5. A first opening 52 through which a later-described first connection pin 61 of the zoom frame 6 is exposed to the outside and a second opening 53 through which a later-described second connection pin 62 of the zoom frame 6 is exposed to the outside are formed at the body frame 5. Each of the linear grooves 51, the first opening 52, and the second opening 53 penetrates the body frame 5 in the radial direction.

The zoom frame 6 is a cylindrical member extending in the optical axis direction. The zoom frame 6 is housed in the body frame 5 so as to move relative to the body frame 5. The first and second connection pins 61, 62 protruding in the radial direction are provided on an outer circumferential surface of the zoom frame 6. The first connection pin 61 is provided on part of the zoom frame 6 exposed through the first opening 52 of the body frame 5. The first connection pin 61 engages with a later-described zoom ring 102 of the operating part 10. That is, the zoom ring 102 is rotatably operated to rotate the zoom frame 6 relative to the body frame 5. The second connection pin 62 is provided on part of the zoom frame 6 exposed through the second opening 53 of the body frame 5. Although will be described in detail later, the second connection pin 62 engages with the diopter adjuster 9. The zoom frame 6 is an example of a frame body.

A plurality of first cam grooves 63 and a plurality of second cam grooves 64 are formed at the zoom frame 6. Each of the first cam grooves 63 and the second cam grooves 64 penetrates the zoom frame 6 in the radial direction. The first cam grooves 63 define movement of the first-lens-group frame 7 in the optical axis direction while the zoom frame 6 is rotating. Moreover, the second cam grooves 64 define movement of the second-lens-group frame 8 in the optical axis direction while the zoom frame 6 is rotating. Each of the first cam grooves 63 and the second cam grooves 64 is an example of a cam groove.

The first-lens-group frame 7 is a cylindrical member extending in the optical axis direction. The first-lens-group frame 7 holds a first lens group L1. The first lens group L1 includes a plurality of lenses. The first lens group L1 has positive refractive power. The first lens group L1 is an example of a first lens. A plurality of first-lens-group connection pins 71 protruding in the radial direction are provided on an outer circumferential surface of the first-lens-group frame 7.

The second-lens-group frame 8 is a cylindrical member extending in the optical axis direction. The second-lens-group frame 8 holds a second lens group L2. The second lens group L2 includes a plurality of lenses. The second lens group L2 has positive refractive power. The second lens group L2 is an example of a second lens. A plurality of second-lens-group connection pins 81 extending in the radial direction are provided on an outer circumferential surface of the second-lens-group frame 8.

The first-lens-group frame 7 and the second-lens-group frame 8 are housed in the zoom frame 6. In this state, the first lens group L1 and the second lens group L2 are arranged on the optical axis A2. The second-lens-group frame 8 is disposed closer to the base 4 than the first-lens-group frame 7 is to. That is, the first lens group L1, the second lens group L2, the third lens group L3, and the display 41 are arranged on the optical axis A2 in this order from the rear.

Each first-lens-group connection pin 71 penetrates a corresponding one of the first cam grooves 63 of the zoom frame 6, and engages with a corresponding one of the linear grooves 51 of the body frame 5. Each second-lens-group connection pin 81 penetrates a corresponding one of the second cam grooves 64 of the zoom frame 6, and engages with a corresponding one of the linear grooves 51 of the body frame 5. In assembly, the zoom frame 6 is housed in the body frame 5, and the first-lens-group frame 7 and the second-lens-group frame 8 are housed in the zoom frame 6. In this state, each first-lens-group connection pin 71 is attached to the outer circumferential surface of the first-lens-group frame 7 after penetrating, from the outside in the radial direction, a corresponding one of the linear grooves 51 of the body frame 5 and a corresponding one of the first cam grooves 63 of the zoom frame 6, and each second-lens-group connection pin 81 is attached to the outer circumferential surface of the second-lens-group frame 8 after penetrating, from the outside in the radial direction, a corresponding one of the linear grooves 51 of the body frame 5 and a corresponding one of the second cam grooves 64 of the zoom frame 6.

The first lens group L1, the second lens group L2, and the third lens group L3 form the finder optical system S2. The first lens group L1 and the second lens group L2 function as a zoom lens. That is, the first lens group L1 and the second lens group L2 change the positions thereof in the optical axis direction to change the zoom magnification of an image viewed through the finder optical system S2. The third lens group L3 includes the lens for reducing the angle of light incidence to the display 41. Thus, incident angle dependence of the display 41 can be reduced. That is, even if the display 41 has such properties that the degree of color deviation with respect to the angle of incidence and the change in brightness with respect to the angle of incidence are great, the angle of incidence can be reduced by the third lens group L3, and therefore the color deviation and the change in brightness can be reduced.

The diopter adjuster 9 includes an adjustment frame 91 and a guide 92. The diopter adjuster 9 is configured to adjust the diopter of the finder optical system S2. Specifically, the diopter adjuster 9 defines movement of the zoom frame 6 in the optical axis direction while the zoom frame 6 is rotating.

The adjustment frame 91 is a cylindrical member extending in the optical axis direction. The adjustment frame 91 is attached to an outer circumferential surface of the body frame 5 so as to rotate relative to the body frame 5. That is, the body frame 5 is inserted into the adjustment frame 91. A cam groove 93 is formed at the adjustment frame 91. The cam groove 93 extends obliquely to the circumferential direction. Moreover, an opening 91a through which the first connection pin 61 of the zoom frame 6 is exposed to the outside is formed at the adjustment frame 91. The cam groove 93 and the opening 91a penetrate the adjustment frame 91 in the radial direction.

Referring to FIG. 5, a recess 91b recessed in the optical axis direction is formed at a rear end part of the adjustment frame 91 in the optical axis direction. The recess 91b engages with a later-described diopter ring 104 of the operating part 10.

The guide 92 engages with the zoom frame 6, and is configured to guide the zoom frame 6 during rotation thereof. FIG. 6A is a perspective view of the guide 92, and FIG. 6B is a perspective view of the guide 92 from an angle different from that of FIG. 6A. FIGS. 7A and 7B are side views of the viewfinder 3 from the angle at which the guide 92 can be viewed. FIG. 7A illustrates the state in which the diopter is adjusted to a far-sighted side, and FIG. 7B illustrates the state in which the diopter is adjusted to a near-sighted side. The guide 92 is a plate-shaped member curved substantially along the circumferential direction. A hole 94 is formed at one end part of the guide 92 in the circumferential direction. A rotary shaft 95 to be attached to the body frame 5 is inserted into the hole 94. That is, the guide 92 is attached to the body frame 5 so as to be tiltable about the rotary shaft 95. The guide 92 is attached to the body frame 5 so as to cover substantially the entirety of the second opening 53.

On the other hand, an engagement piece 96 and a hook 97 are provided at the other end part of the guide 92 in the circumferential direction. A holder 54 configured to slidably hold the engagement piece 96 is attached to the body frame 5. That is, the engagement piece 96 is slidably housed in a clearance between the body frame 5 and the holder 54. This reduces or prevents uplifting of the guide 92 when the guide 92 tilts about the rotary shaft 95. One end part of a coil spring 98 is connected to the hook 97. The coil spring 98 is disposed so as to extend substantially in the optical axis direction, and the other end part of the coil spring 98 is connected to the body frame 5 (specifically, the holder 54). The coil spring 98 is extended longer than the natural length thereof. That is, the coil spring 98 biases an end part, at which the hook 97 is provided, of the guide 92 toward the front in the optical axis direction.

A protrusion 99 is provided on a surface (i.e., an inner surface of the guide 92 in the radial direction) of the guide 92 facing the body frame 5. The protrusion 99 engages with the cam groove 93 of the adjustment frame 91. That is, while the adjustment frame 91 is rotating, the protrusion 99 moves in accordance with the shape of the cam groove 93. Accordingly, the guide 92 tilts about the rotary shaft 95.

A guide groove 910 extending substantially in the circumferential direction is formed at the guide 92. The guide groove 910 penetrates the guide 92 in the radial direction. The guide groove 910 engages with the second connection pin 62 of the zoom frame 6 outwardly protruding through the second opening 53. That is, the guide groove 910 guides the second connection pin 62 while the zoom frame 6 is rotating.

Referring to FIGS. 3 and 4, the operating part 10 includes a fixed ring 101, the zoom ring 102, an intermediate ring 103, and the diopter ring 104.

The fixed ring 101 is fitted onto the outer circumferential surface of the body frame 5 from the rear. That is, a substantially rear half of the body frame 5 is inserted into the fixed ring 101. The fixed ring 101 is attached to a rear end surface of the body frame 5. The zoom ring 102, the intermediate ring 103, and the diopter ring 104 are fitted onto an outer circumferential surface of the fixed ring 101. The diopter ring 104, the intermediate ring 103, and the zoom ring 102 are arranged in this order from the rear in the optical axis direction. The zoom ring 102 is rotatable about the optical axis A2. The intermediate ring 103 is unrotatably attached to the fixed ring 101. The diopter ring 104 is rotatable about the optical axis A2. Note that the fixed ring 101 and the intermediate ring 103 are not shown in FIGS. 5, 7A, and 7B.

A user operates the zoom ring 102 in order to adjust the zoom magnification of an image viewed through the finder optical system S2. While the zoom ring 102 is rotating, the first-lens-group frame 7 and the second-lens-group frame 8 move in the optical axis direction. Referring to FIG. 5, an engagement part 121 extending toward the front in the optical axis direction is provided at the zoom ring 102. An engagement groove 122 extending in the optical axis direction is formed at the engagement part 121. The engagement groove 122 engages with the first connection pin 61 exposed to the outside through the first opening 52 of the body frame 5 and the opening 91a of the adjustment frame 91. While the zoom ring 102 is rotating, engagement between the engagement groove 122 and the first connection pin 61 causes the zoom frame 6 to rotate integrally with the zoom ring 102.

Figure 8A:
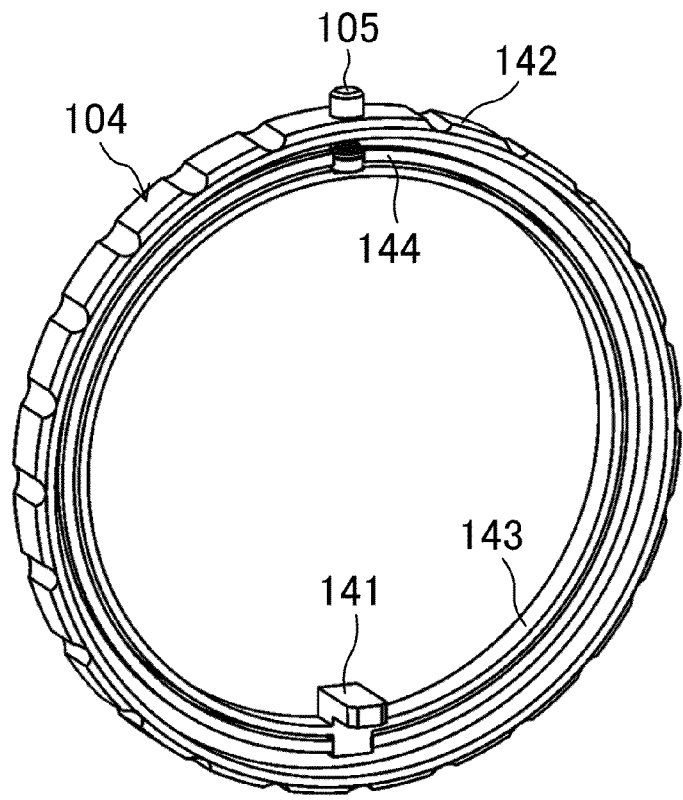
FIGS. 8A and 8B are perspective views of a diopter ring diagonally from the front.
Figure 8B:
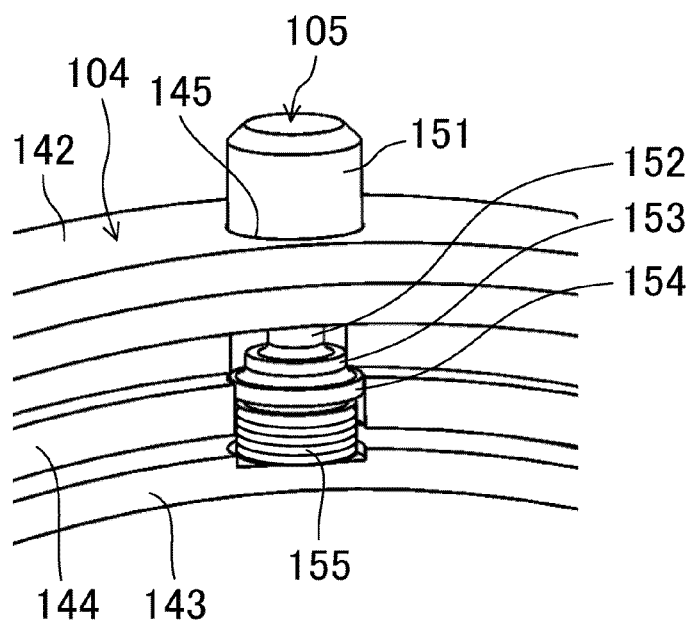

A user operates the diopter ring 104 in order to adjust the diopter of the finder optical system S2. The diopter ring 104 is an example of an operating part. FIGS. 8A and 8B are perspective views of the diopter ring 104 diagonally from the front. FIG. 8A illustrates the entirety of the diopter ring 104, and FIG. 8B is an enlarged view of an anti-rotation pin 105. The anti-rotation pin 105 is provided at the diopter ring 104. The diopter ring 104 is rotatable when the anti-rotation pin 105 is pressed, and is not rotatable when the anti-rotation pin 105 is not pressed. A protrusion 141 protruding toward the front is provided at the diopter ring 104. Referring to FIG. 5, the protrusion 141 engages with the recess 91b of the adjustment frame 91. That is, while the diopter ring 104 is rotating, engagement between the protrusion 141 and the recess 91b causes the adjustment frame 91 to rotate integrally with the diopter ring 104.

The diopter ring 104 includes an outer ring part 142, an inner ring part 143, and a connection part 144 connecting between the outer ring part 142 and the inner ring part 143. The outer ring part 142 and the inner ring part 143 are formed in a cylindrical shape about the optical axis A2. The outer ring part 142 has a radius larger than that of the inner ring part 143, and is disposed at the outer periphery of the inner ring part 143. The inner ring part 143 slidably contacts the outer circumferential surface of the fixed ring 101. The connection part 144 connects between a rear end part of the outer ring part 142 in the optical axis direction and a rear end part of the inner ring part 143 in the optical axis direction.

An arrangement hole 145 extending in the radial direction is formed at the diopter ring 104. The arrangement hole 145 penetrates the outer ring part 142. The arrangement hole 145 is also formed at the inner ring part 143 and the connection part 144. Note that part of the arrangement hole 145 formed at the outer ring part 142 is in an exact circular shape, whereas part of the arrangement hole 145 formed at each of the inner ring part 143 and the connection part 144 is in an arc shape, i.e., in such a shape that each of the inner ring part 143 and the connection part 144 is partially cut out. That is, the anti-rotation pin 105 disposed in the arrangement hole 145 is partially exposed on the front in the inner ring part 143 and the connection part 144. The arrangement hole 145 does not penetrate the inner ring part 143.

The anti-rotation pin 105 includes a head part 151, a small-diameter part 152 having an outer diameter smaller than that of the head part 151, an intermediate-diameter part 153 having an outer diameter larger than that of the small-diameter part 152, and a large-diameter part 154 having an outer diameter larger than that of the intermediate-diameter part 153. The head part 151, the small-diameter part 152, the intermediate-diameter part 153, and the large-diameter part 154 are in a cylindrical shape, and are formed so as to be concentric with each other. The head part 151, the small-diameter part 152, the intermediate-diameter part 153, and the large-diameter part 154 are arranged in this order. That is, the anti-rotation pin 105 is formed in a stepped shape.

The anti-rotation pin 105 is disposed in the arrangement hole 145. The head part 151 is fitted into the arrangement hole 145 of the outer ring part 142, and outwardly protrudes from the outer ring part 142 in the radial direction. The small-diameter part 152, the intermediate-diameter part 153, and the large-diameter part 154 are positioned on the inside of the outer ring part 142 in the radial direction.

A coil spring 155 is provided between the large-diameter part 154 of the anti-rotation pin 105 and the inner ring part 143. The coil spring 155 is disposed in a compressed state, and outwardly biases the anti-rotation pin 105 in the radial direction.

Figure 9:
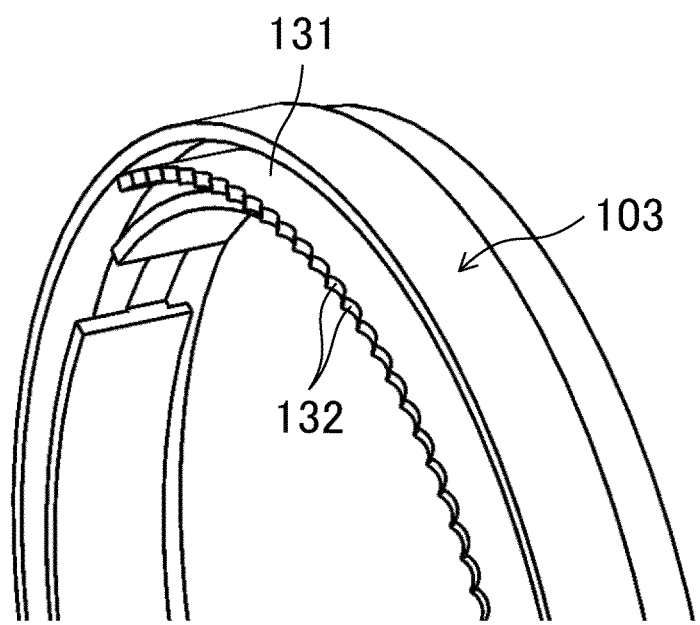
FIG. 9 is a perspective view of an intermediate ring diagonally from the rear.

FIG. 9 is a perspective view of the intermediate ring 103 diagonally from the rear. FIGS. 10A and 10B are cross-sectional views of the diopter ring 104 with the anti-rotation pin 105 being visible. FIG. 10A illustrates the state in which the anti-rotation pin 105 is not pressed, and FIG. 10B illustrates the state in which the anti-rotation pin 105 is pressed. A protruding piece 131 protruding toward the rear in the optical axis direction is provided at the intermediate ring 103. The protruding piece 131 extends in the circumferential direction. Referring to FIGS. 10A and 10B, the protruding piece 131 extends, in the optical axis direction, to the inside of the outer ring part 142 of the diopter ring 104 in the radial direction. That is, as viewed in the radial direction, the outer ring part 142 and the protruding piece 131 partially overlap with each other. At a rear end part of the protruding piece 131 in the optical axis direction, a plurality of recesses 132 are formed so as to be arranged in the circumferential direction. Each recess 132 is formed in such an arc shape that the inner diameter of the recess 132 is substantially the same as the outer diameter of the intermediate-diameter part 153 (in a precise sense, the inner diameter of the recess 132 is slightly larger than the outer diameter of the intermediate-diameter part 153). That is, the inner diameter of the recess 132 is smaller than the outer diameter of the large-diameter part 154, and is larger than the outer diameter of the small-diameter part 152. The center of the arc of the recess 132 is substantially coincident with the center of the arrangement hole 145, i.e., the center of the anti-rotation pin 105.

In a normal state, i.e., the state in which the diopter ring 104 is not operated, the anti-rotation pin 105 is not pressed, and is outwardly pushed in the radial direction by biasing force of the coil spring 155. In this state, the large-diameter part 154 of the anti-rotation pin 105 contacts, referring to FIG. 10A, the protruding piece 131 from the inside in the radial direction. Thus, outward movement of the anti-rotation pin 105 in the radial direction is blocked. That is, the large-diameter part 154 functions as a retainer configured to prevent the anti-rotation pin 105 from coming out of the arrangement hole 145.

In the foregoing state, the head part 151 outwardly protrudes from the outer ring part 142 in the radial direction. Moreover, the intermediate-diameter part 153 is fitted into the recess 132 of the protruding piece 131. Since the intermediate-diameter part 153 engages with the recess 132, rotation of the anti-rotation pin 105 about the optical axis A2 relative to the intermediate ring 103, i.e., rotation of the diopter ring 104 about the optical axis A2 relative to the intermediate ring 103, is blocked. The intermediate ring 103 is fixed to the fixed ring 101, and the fixed ring 101 is fixed to the body frame 5. Thus, the diopter ring 104 is not rotatable relative to the body frame 5.

On the other hand, in operation of the diopter ring 104, the anti-rotation pin 105 is inwardly pressed in the radial direction. When the anti-rotation pin 105 is inwardly pressed in the radial direction, the anti-rotation pin 105 inwardly moves against biasing force of the coil spring 155 in the radial direction. Then, referring to FIG. 10B, the intermediate-diameter part 153 and the recess 132 disengage from each other, and therefore the position of the small-diameter part 152 in the radial direction corresponds to the position of the recess 132 in the radial direction. Since the protruding piece 131 does not reach the small-diameter part 152 in the optical axis direction, the small-diameter part 152 and the recess 132 do not engage with each other. Thus, the diopter ring 104 is rotatable about the optical axis A2 relative to the intermediate ring 103. That is, a user rotates the diopter ring 104 with the anti-rotation pin 105 being inwardly pressed in the radial direction. Then, when the pressed anti-rotation pin 105 is released after the diopter ring 104 is rotated to a proper position, the intermediate-diameter part 153 comes into engagement with another recess 132, and rotation of the diopter ring 104 is blocked.

3. ZOOMING

Next, zooming will be described.

When a user rotates the zoom ring 102, the zoom frame 6 and the zoom ring 102 rotate relative to the body frame 5 in an integrated manner. Since the second connection pin 62 of the zoom frame 6 engages with the guide groove 910 of the guide 92, the zoom frame 6 is guided by the guide groove 910 during rotation thereof. In this state, each first-lens-group connection pin 71 of the first-lens-group frame 7 housed in the zoom frame 6 penetrates a corresponding one of the first cam grooves 63 of the zoom frame 6, and engages with a corresponding one of the linear grooves 51 of the body frame 5. Similarly, each second-lens-group connection pin 81 of the second-lens-group frame 8 housed in the zoom frame 6 penetrates a corresponding one of the first cam grooves 63 of the zoom frame 6, and engages with a corresponding one of the linear grooves 51 of the body frame 5. As just described, rotation of the first-lens-group frame 7 and rotation of the second-lens-group frame 8 are restricted by the linear grooves 51 of the body frame 5, whereas the first-lens-group frame 7 and the second-lens-group frame 8 are movable in the optical axis direction along the linear grooves 51. Thus, while the zoom frame 6 is rotating, the first-lens-group frame 7 moves in the optical axis direction in accordance with the shape of the first cam grooves 63, and the second-lens-group frame 8 moves in optical axis direction in accordance with the shape of the second cam grooves 64.

When the distance between the first-lens-group frame 7 (i.e., the first lens group L1) and the display 41 and the distance between the second-lens-group frame 8 (i.e., the second lens group L2) and the display 41 change, the zoom magnification of an image viewed through the finder optical system S2 changes accordingly. Specifically, when the distance to the first lens group L1 and the distance to the second lens group L2 change, the composite focal distance of the first lens group L1 and the second lens group L2 changes accordingly. The composite focal distance increases with increasing the distance to the first lens group L1 and the distance to the second lens group L2, thereby zooming out an image displayed on the display 41. The composite focal distance decreases with decreasing the distance to the first lens group L1 and the distance to the second lens group L2, thereby zooming in an image displayed on the display 41.

Since the zoom frame 6 itself is guided by the guide groove 910 to move in the optical axis direction, the total amount of movement of the first-lens-group frame 7 in the optical axis direction is equal to the sum of the amount of movement, in the optical axis direction, of the zoom frame 6 guided by the guide 92 and the amount of movement, in the optical axis direction, of the first-lens-group frame 7 guided by the first cam grooves 63. Similarly, the total amount of movement of the second-lens-group frame 8 in the optical axis direction is equal to the sum of the amount of movement, in the optical axis direction, of the zoom frame 6 guided by the guide 92 and the amount of movement, in the optical axis direction, of the second-lens-group frame 8 guided by the second cam grooves 64.

4. DIOPTER ADJUSTMENT

Next, diopter adjustment will be described.

Typically in the configuration in which the first-lens-group frame 7 and the second-lens-group frame 8 move, by rotation of the zoom frame 6, in the optical axis direction in accordance with the shapes of the first cam grooves 63 and the second cam grooves 64 to change zoom magnification, the first cam grooves 63 and the second cam grooves 64 are shaped so that the first-lens-group frame 7 and the second-lens-group frame 8 can move to proper positions corresponding the zoom magnification by rotation of the zoom frame 6. In this case, the positions of the first-lens-group frame 7 and the second-lens-group frame 8 corresponding to the zoom magnification are set such that the diopter of the finder optical system S2 is maintained at a predetermined reference diopter (hereinafter referred to as "reference diopter"). That is, the first cam grooves 63 and the second cam grooves 64 are formed so that the zoom magnification can change with the diopter of the finder optical system S2 being maintained at the reference diopter.

The viewfinder 3 is configured such that the diopter of the finder optical system S2 is adjusted and that the adjusted diopter is maintained even with the change in zoom magnification. Specifically, the diopter is adjusted by adjustment of the position of the zoom frame 6 in the optical axis direction. In addition, the zoom frame 6 itself moves in the optical axis direction when the zoom magnification is changed, and such a moving pattern of the zoom frame 6 in the optical axis direction is changed depending on diopter. In this manner, the moving patterns of the first-lens-group frame 7 and the second-lens-group frame 8 in zooming are changed depending on diopter, and the zoom magnification is changed with the adjusted diopter being maintained.

Specifically, in the viewfinder 3, the diopter of the finder optical system S2 can be adjusted by rotation of the diopter ring 104. While the diopter ring 104 is rotating, the adjustment frame 91 and the diopter ring 104 rotate relative to the body frame 5 in an integrated manner. The protrusion 99 of the guide 92 engages with the cam groove 93 of the adjustment frame 91. Thus, while the adjustment frame 91 is rotating, the protrusion 99 moves relative to the cam groove 93 in the cam groove 93. Accordingly, the guide 92 tilts about the rotary shaft 95. When the guide 92 tilts, the inclination angle of the guide groove 910 of the guide 92 with respect to the circumferential direction changes. That is, the inclination angle of the guide groove 910 with respect to the circumferential direction is changed depending on diopter. Unless otherwise provided, the "inclination angle" means the inclination angle with respect to the circumferential direction.

The second connection pin 62 of the zoom frame 6 engages with the guide groove 910. Thus, while the zoom frame 6 is rotating in zooming, the second connection pin 62 moves in the guide groove 910. That is, the zoom frame 6 moves, during rotation thereof, in the optical axis direction in accordance with the shape of the guide groove 910. When the inclination angle of the guide groove 910 is changed, the moving pattern of the zoom frame 6 in the optical axis direction during rotation thereof is changed. For example, in the case of a large inclination angle of the guide groove 910 with respect to the circumferential direction, the amount of movement of the zoom frame 6 in the optical axis direction during rotation thereof increases. In the case of a small inclination angle of the guide groove 910, the amount of movement of the zoom frame 6 in the optical axis direction during rotation thereof decreases. Note that, when the guide groove 910 is not inclined with respect to the circumferential direction, i.e., when the extension direction of the guide groove 910 is coincident with the circumferential direction, the zoom frame 6 does not move in the optical axis direction during rotation thereof. An optical-axis-direction side toward which the zoom frame 6 moves during rotation thereof is changed depending on toward which side the guide groove 910 is inclined with respect to the circumferential direction. Inclination of the guide groove 910 is adjusted depending on diopter.

While the zoom frame 6 is rotating, the first-lens-group frame 7 disposed in the zoom frame 6 moves in the optical axis direction in accordance with the shape of the first cam grooves 63, and the second-lens-group frame 8 disposed in the zoom frame 6 moves in the optical axis direction in accordance with the shape of the second cam grooves 64. Movement of the first-lens-group frame 7 and the second-lens-group frame 8 relative to the zoom frame 6 depends on the shapes of the first cam grooves 63 and the second cam grooves 64. Thus, even if the inclination angle of the guide groove 910 is changed, the moving patterns of the first-lens-group frame 7 and the second-lens-group frame 8 relative to the zoom frame 6 do not change.

As just described, while the zoom frame 6 is rotating, the zoom frame 6 itself is guided by the guide groove 910 to move in the optical axis direction, and the first-lens-group frame 7 and the second-lens-group frame 8 move relative to the zoom frame 6 in the optical axis direction. The total amount of movement of the first-lens-group frame 7 and the second-lens-group frame 8 in the optical axis direction is equal to the sum of the amount of movement of the zoom frame 6 itself in the optical axis direction and the amount of movement of the first-lens-group frame 7 and the second-lens-group frame 8 relative to the zoom frame 6 in the optical axis direction. The amount of movement of the zoom frame 6 itself in the optical axis direction is adjusted depending on diopter. That is, movement of the zoom frame 6 itself in the optical axis direction fulfills the role of correcting the positions of the first-lens-group frame 7 and the second-lens-group frame 8 in the optical axis direction depending on diopter (specifically, correcting the positions of the first-lens-group frame 7 and the second-lens-group frame 8 in the optical axis direction such that the diopter is maintained at a desired value).

Figure 11:
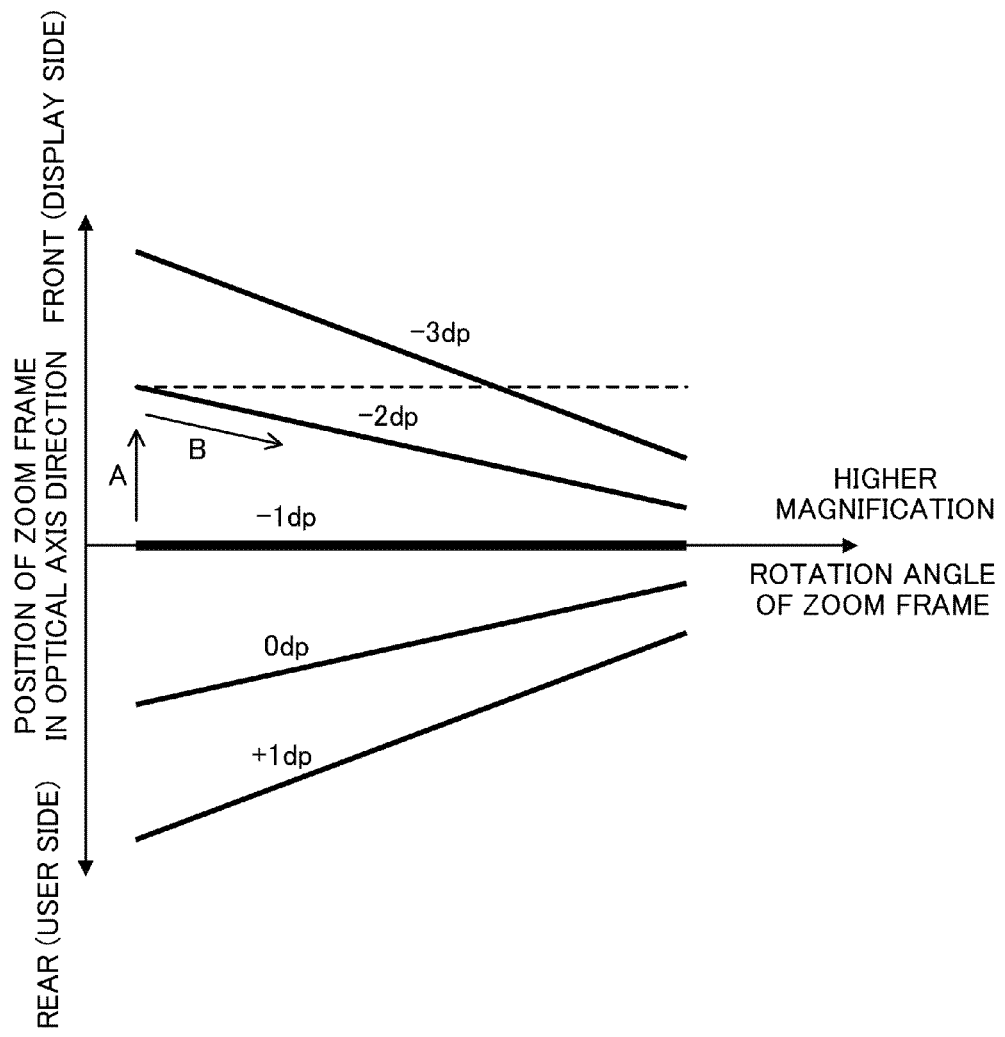
FIG. 11 is a graph illustrating the relationship between the rotation angle of a zoom frame and the position of the zoom frame in an optical axis direction.

Subsequently, a specific moving pattern of the zoom frame 6 itself will be described. FIG. 11 illustrates the relationship between the rotation angle of the zoom frame 6 and the position of the zoom frame 6 in the optical axis direction. As described above, the diopter is adjusted by rotation of the diopter ring 104. While the diopter ring 104 is rotating, the adjustment frame 91 rotates, and the guide 92 tilts in association with rotation of the adjustment frame 91. Tilting of the guide 92 causes the zoom frame 6 to move in the optical axis direction, thereby adjusting the diopter. In addition, tilting of the guide 92 changes the inclination angle of the guide groove 910. Thus, the moving pattern of the zoom frame 6 in the optical axis direction in zooming changes depending on the guide groove 910. This allows, in zooming, the first-lens-group frame 7 and the second-lens-group frame 8 to move in the optical axis direction with the adjusted diopter being maintained. Note that the zoom magnification is, as described above, adjusted by rotation of the zoom ring 102.

Specifically, the first cam grooves 63 and the second cam grooves 64 are, as described above, designed such that the zoom magnification is changed with the diopter of the finder optical system S2 being maintained at the reference diopter. For example, the reference diopter of the viewfinder 3 of the present embodiment is set at −1 dp (diopter). When an object point distance is L [m], the diopter is represented by −1/L [dp].

In order to maintain the diopter of the finder optical system S2 at −1 dp, the zoom frame 6 itself is not necessarily moved in the optical axis direction, and only the first-lens-group frame 7 and the second-lens-group frame 8 are moved relative to the zoom frame 6. In this manner, the zoom magnification can be changed with the diopter being maintained at −1 dp. Thus, when the diopter of the finder optical system S2 is −1 dp, the position (i.e., the attitude) of the guide 92 is adjusted such that the extension direction of the guide groove 910 becomes substantially coincident with the circumferential direction (i.e., such that the inclination angle of the guide groove 910 becomes substantially 0°). Since the guide groove 910 extends in the circumferential direction, the zoom frame 6 is, during rotation thereof, guided only in the circumferential direction by the guide groove 910, and therefore movement of the zoom frame 6 in the optical axis direction is restricted. That is, referring to FIG. 11, when the diopter of the finder optical system S2 is −1 dp, the position of the zoom frame 6 in the optical axis direction does not change even if the zoom frame 6 rotates for zooming. Since movement of the first-lens-group frame 7 and the second-lens-group frame 8 in the optical axis direction in association with movement of the zoom frame 6 itself in the optical axis direction (i.e., the amount of correction of the positions of the first-lens-group frame 7 and the second-lens-group frame 8 in the optical axis direction by movement of the zoom frame 6 itself in the optical axis direction) is zero, movement of the first-lens-group frame 7 and the second-lens-group frame 8 in the optical axis direction is only movement relative to the zoom frame 6.

In order to change the diopter from the reference diopter, the position of the guide 92 is changed. Specifically, the guide 92 is tilted to tilt the guide groove 910 with respect to the circumferential direction. Tilting of the guide 92 changes the position of the zoom frame 6 in the optical axis direction. Moreover, tilting of the guide 92 causes the zoom frame 6 itself to move in the optical axis direction during rotation of the zoom frame 6.

Specifically, in the case where the diopter is changed to a negative side, i.e., the near-sighted side (e.g., the case where the diopter is changed to −2 dp), the guide 92 tilts toward the front as illustrated in FIG. 7B. That is, the guide 92 is tilted such that an end part of the guide 92 opposite to the rotary shaft 95 moves toward the front. Since the zoom frame 6 engages with the guide 92, the zoom frame 6 moves, as compared to the state in which the diopter is at the reference diopter, toward the front in association with tilting of the guide 92 toward the front. For example, in the case where the diopter is adjusted with the zoom magnification being at the minimum value, the zoom frame 6 moves toward the front as indicated by an arrow A in FIG. 11. By such movement of the zoom frame 6 in the optical axis direction, the positions of the first-lens-group frame 7 and the second-lens-group frame 8 in the optical axis direction are corrected, and therefore the diopter is changed from −1 dp to −2 dp. Note that the diopter is adjusted to a desired value in such a manner that the amount of movement of the zoom frame 6 in the optical axis direction, i.e., the amount of tilting of the guide 92, is adjusted.

The amount of correction of the positions of the first-lens-group frame 7 and the second-lens-group frame 8 in the optical axis direction varies depending on zoom magnification. That is, the position, at which the diopter is maintained at −2 dp, of the zoom frame 6 in the optical axis direction varies depending on zoom magnification. As indicated by, e.g., a dashed line in FIG. 11, after the diopter is, with the magnification being at the minimum value, adjusted to −2 dp by changing the position of the zoom frame 6 in the optical axis direction, zooming is performed without changing the position of the zoom frame 6 in the optical axis direction. In this case, the diopter shifts from −2 dp when the zoom magnification is at a value other than the minimum magnification.

In the viewfinder 3, tilting of the guide 92 causes the guide groove 910 to tilt with respect to the circumferential direction. Thus, as indicated by an arrow B in FIG. 11, while the zoom frame 6 is rotating to change the zoom magnification, the zoom frame 6 is guided by the guide groove 910 to move in the optical axis direction. That is, the amount of correction of the positions of the first-lens-group frame 7 and the second-lens-group frame 8 in the optical axis direction is changed in association with rotation of the zoom frame 6, i.e., the change in zoom magnification. Specifically, the guide groove 910 tilts such that the zoom frame 6 moves toward the rear as the zoom frame 6 rotates in the direction in which the zoom magnification increases. As a result, a lower magnification results in a larger correction amount, whereas a higher magnification results in a smaller correction amount.

More specifically, since the guide groove 910 is formed so as to define a straight line in the state in which the guide 92 is flattened, the amount of movement of the zoom frame 6 in the optical axis direction linearly changes depending on the rotation angle of the zoom frame 6 in the state in which the guide groove 910 is inclined with respect to the circumferential direction. Specifically, referring to FIG. 11, while the zoom frame 6 is rotating from a low-magnification side to a high-magnification side, the zoom frame 6 moves, in proportion to the rotation angle thereof, toward the rear in the optical axis direction. Such movement of the zoom frame 6 in the optical axis direction maintains the diopter at −2 dp even during zooming. That is, the first cam grooves 63 and the second cam grooves 64 are formed so that linear movement of the zoom frame 6 in the optical axis direction depending on the rotation angle of the zoom frame 6 can maintain the diopter during the change in zoom magnification.

As described above, the amount of correction, which is for maintaining the diopter at a certain value, of the positions of the first-lens-group frame 7 and the second-lens-group frame 8 in the optical axis direction (i.e., the amount of movement of the zoom frame 6 in the optical axis direction) varies depending on diopter. Thus, the pattern of changing the position of the zoom frame 6 in the optical axis direction depending on zoom magnification also varies depending on diopter.

In the viewfinder 3, the shapes of the first cam grooves 63 and the second cam grooves 64 are determined such that the amount, which is required for maintaining the diopter during the change in zoom magnification depending on the rotation angle of the zoom frame 6, of movement of the zoom frame 6 in the optical axis direction is proportional to the rotation angle of the zoom frame 6. According to such a configuration, even when the diopter of the finder optical system S2 changes, the diopter during zooming can be maintained by changing, depending on diopter, the change ratio of the amount of movement of the zoom frame 6 in the optical axis direction to the rotation angle of the zoom frame 6. That is, any adjusted diopter can be maintained during zooming in such a manner that inclination of the guide groove 910 is changed depending on adjustment of the diopter.

Specifically, when the diopter is adjusted to −3 dp, the guide 92 is tilted toward the front as compared to the state in which the diopter is −2 dp. This changes the position of the zoom frame 6 in the optical axis direction toward the front as compared to the state in which the diopter is −2 dp. In addition, an absolute value for inclination angle of the guide groove 910 becomes larger than that in the state in which the diopter is −2 dp. That is, an absolute value for change ratio of the amount of movement of the zoom frame 6 in the optical axis direction to the rotation angle of the zoom frame 6 becomes larger than that in the state in which the diopter is −2 dp. As a result, the diopter is maintained at −3 dp even during zooming.

On the other hand, in the case where the diopter is changed to a positive side, i.e., the far-sighted side (e.g., the case where the diopter is changed to 0 dp), the guide 92 tilts toward the rear as illustrated in FIG. 7A. That is, the guide 92 is tilted such that the end part of the guide 92 opposite to the rotary shaft 95 moves toward the rear. Since the zoom frame 6 engages with the guide 92, the zoom frame 6 moves, as compared to the state in which the diopter is at the reference diopter, toward the rear in association with tilting of the guide 92 toward the rear. Accordingly, the diopter changes from −1 dp to 0 dp.

In addition, tilting of the guide 92 causes the guide groove 910 to tilt with respect to the circumferential direction. Specifically, the guide groove 910 tilts such that the zoom frame 6 moves toward the front while the zoom frame 6 is rotating in the direction in which the zoom magnification increases. As a result, referring to FIG. 11, while the zoom frame 6 is rotating from the low-magnification side to the high-magnification side, the zoom frame 6 moves, in proportion to the rotation angle thereof, toward the front in the optical axis direction. Such movement of the zoom frame 6 in the optical axis direction maintains the diopter at 0 dp even during zooming.

In the case where the diopter is further changed to the far-sighted side (e.g., +1 dp), the guide 92 tilts toward the rear as compared to the state in which the diopter is 0 dp. Accordingly, the zoom frame 6 further moves to the rear as compared to the state in which the diopter is 0 dp. In addition, the absolute value for inclination angle of the guide groove 910 becomes larger than that in the state in which the diopter is 0 dp. That is, the absolute value for change ratio of the amount of movement of the zoom frame 6 in the optical axis direction to the rotation angle of the zoom frame 6 becomes larger than that in the state in which the diopter is 0 dp. Accordingly, the diopter is maintained at +1 dp even during zooming.

As described above, when the diopter is at a value closer to the near-sighted side relative to the reference diopter, the zoom frame 6 is, in the optical axis direction, positioned closer to the front as compared to the state in which the diopter is at the reference diopter. The amount of forward movement of the zoom frame 6 away from the position, at which the diopter is at the reference diopter, of the zoom frame 6 in the optical axis direction increases with lowering the zoom magnification and decreasing the diopter. On the other hand, when the diopter is at a value closer to the far-sighted side relative to the reference diopter, the zoom frame 6 is, in the optical axis direction, positioned closer to the rear as compared to the state in which the diopter is at the reference diopter. The amount of backward movement of the zoom frame 6 away from the position, at which the diopter is at the reference diopter, of the zoom frame 6 in the optical axis direction increases with lowering the zoom magnification and increasing the diopter.

Although FIG. 11 illustrates the cases where the diopter is adjusted to −3 dp, −2 dp, −1 dp, 0 dp, and +1 dp, the diopter can be adjusted to any values. For example, the diopter can be adjusted to −0.7 dp.

5. CONCLUSION

As described above, the viewfinder 3 includes the finder optical system S2 including the first and second lens groups L1, L2 which are arranged on the optical axis A2 and which are moved in the optical axis direction to change the zoom magnification of the finder optical system S2; the zoom frame 6 provided with the first and second cam grooves 63, 64 configured to guide the first and second lens groups L1, L2 and configured to rotate about the optical axis A2 to move the first and second lens groups L1, L2 in the optical axis direction in accordance with the shapes of the first and second cam grooves 63, 64; and the diopter adjuster 9 configured to adjust the diopter of the finder optical system S2. The diopter adjuster 9 changes the position of the zoom frame 6 in the optical axis direction to adjust the diopter of the finder optical system S2, and adjusts, during rotation of the zoom frame 6, the position of the zoom frame 6 in the optical axis direction such that the diopter of the finder optical system S2 is maintained.

According to the foregoing configuration, the zoom frame 6 rotates to move the first and second lens groups L1, L2 in the optical axis direction in accordance with the shapes of the first and second cam grooves 63, 64, thereby changing the zoom magnification of the finder optical system S2. Then, the change in the position of the zoom frame 6 in the optical axis direction adjusts the diopter of the finder optical system S2.

Even when the zoom frame 6 is moved in the optical axis direction to adjust the diopter, if the first and second lens groups L1, L2 move in the optical axis direction in accordance with the shapes of the first and second cam grooves 63, 64 to change the zoom magnification, the diopter of the finder optical system S2 shifts from the adjusted diopter.

By contrast, according to the foregoing configuration, the diopter shifting due to movement of the first and second lens groups L1, L2 only by the first and second cam grooves 63, 64 is corrected by movement of the zoom frame 6 itself in the optical axis direction. Specifically, while the zoom frame 6 is rotating, i.e., while the zoom magnification is being changed, the position of the zoom frame 6 in the optical axis direction is adjusted such that the diopter is maintained. Thus, even though the diopter of the finder optical system is adjustable, the change in diopter during the change in zoom magnification can be reduced, and the adjusted diopter can be maintained. Note that maintenance of the diopter means that the change in diopter is reduced as compared to the case where the first and second lens groups L1, L2 are moved in the optical axis direction only by the first and second cam grooves 63, 64, and does not mean that the diopter is necessarily constant.

Adjustment of the diopter and maintenance of the adjusted diopter can be realized in such a manner that the position, in the optical axis direction, of the zoom frame 6 itself configured to determine the positions of the first and second lens groups L1, L2 in the optical axis direction is adjusted. Thus, an additional lens(es) or an additional mechanism(s) configured to adjust the position(s) of the lens(es) only for diopter adjustment are not necessary. As a result, the configuration of the viewfinder can be simplified.

The diopter adjuster 9 changes, depending on the diopter of the finder optical system S2, the amount of adjustment of the position of the zoom frame 6 in the optical axis direction during rotation of the zoom frame 6.

According to the foregoing configuration, any adjusted diopter can be maintained during the change in zoom magnification. That is, even if the zoom magnification is constant, the suitable positions of the first and second lens groups L1, L2 vary depending on diopter. Thus, the amount, which is required for maintaining the diopter during the change in zoom magnification, of movement of the zoom frame 6 in the optical axis direction varies depending on diopter. The diopter adjuster 9 changes, depending on diopter, the amount of adjustment of the position of the zoom frame 6 in the optical axis direction during rotation of the zoom frame 6. Consequently, any adjusted diopter can be maintained during the change in zoom magnification.

The diopter adjuster 9 is provided with the guide groove 910 configured to guide the zoom frame 6 during rotation thereof and to determine the position of the zoom frame 6 in the optical axis direction during rotation of the zoom frame 6.

According to the foregoing configuration, while the zoom frame 6 is rotating, not only the positions of the first and second lens groups L1, L2 in the optical axis direction but also the position of the zoom frame 6 itself in the optical axis direction change. That is, the zoom frame 6 itself is moved in the optical axis direction, using rotation of the zoom frame 6 originally functioning to change the positions of the first and second lens groups L1, L2 in the optical axis direction. As a result, the operation of only reducing the change in diopter is not necessary, and the zoom frame 6 itself can be, at the same time as the operation of changing the zoom magnification, moved in the optical axis direction to reduce the change in diopter.

The diopter adjuster 9 changes, depending on the diopter of the finder optical system S2, inclination of the guide groove 910 with respect to the circumferential direction about the optical axis A2, thereby adjusting the position of the zoom frame 6 in the optical axis direction during rotation of the zoom frame 6 such that the diopter of the finder optical system S2 is maintained.

In order to change the zoom magnification with any adjusted diopter being maintained, it is necessary to change, depending on diopter, the moving pattern of the zoom frame 6 itself in the optical axis direction during rotation of the zoom frame 6. The moving pattern of the zoom frame 6 itself in the optical axis direction during rotation of the zoom frame 6 depends on the guide groove 910. According to the foregoing configuration, inclination of the guide groove 910 is changed to change the moving pattern of the zoom frame 6 itself in the optical axis direction. The change in inclination of the guide groove 910 changes the amount of movement of the zoom frame 6 in the optical axis direction depending on the amount of rotation of the zoom frame 6. Thus, adjustment of inclination of the guide groove 910 allows the diopter to be maintained during the change in zoom magnification.

The diopter adjuster 9 includes the guide 92 provided with the guide groove 910, and tilts the guide 92 to change inclination of the guide groove 910 with respect to the circumferential direction about the optical axis A2.

According to the foregoing configuration, inclination of the guide groove 910 can be changed by tilting of the guide 92. For example, the member provided with the guide groove 910 may be replaced with another member provided with a guide groove 910 having different inclination, thereby changing inclination of the guide groove 910. However, in such a case, the operation of adjusting the diopter is complicated. On the other hand, according to the foregoing configuration, inclination of the guide groove 910 can be changed by the simple operation of tilting the guide 92.

The guide groove 910 is formed such that the amount of movement of the zoom frame 6 in the optical axis direction linearly changes depending on the rotation angle of the zoom frame 6.

According to the foregoing configuration, the shapes of the first and second cam grooves 63, 64 are formed such that the amount, which is required for maintaining the diopter during the change in zoom magnification depending on the rotation angle of the zoom frame 6, of movement of the zoom frame 6 in the optical axis direction is proportional to the rotation angle of the zoom frame 6. According to such a configuration, the diopter during zooming can be maintained in such a manner that the change ratio of the amount of movement of the zoom frame 6 in the optical axis direction to the rotation angle of the zoom frame 6, i.e., inclination of the guide groove 910, is changed depending on diopter. That is, optional diopter can be maintained during zooming by the simple operation of adjusting inclination of the guide groove 910.

The diopter adjuster 9 includes the adjustment frame 91 configured to rotate about the optical axis A2, and the guide 92 is connected to the adjustment frame 91 so as to tilt in association with rotation of the adjustment frame 91.

According to the foregoing configuration, the guide 92 can be tilted by rotation of the adjustment frame 91.

The diopter adjuster 9 further includes the diopter ring 104 connected to the adjustment frame 91 and operated by a user, and the adjustment frame 91 is rotated by the diopter ring 104.

According to the foregoing configuration, a user operations the diopter ring 104 to rotate the adjustment frame 91, and the guide 92 tilts accordingly.

The viewfinder 3 further includes the display 41 configured to display an image; and the third lens group L3 disposed on the optical axis A2 and having negative refractive power. The third lens group L3 is disposed closest to the display 41 among the first, second, and third lens groups L1, L2, L3.

According to the foregoing configuration, the third lens group L3 can reduce the angle of incident light into the display 41. Thus, even if incident angle dependence of the display 41 is large, color deviation of an image and the change in brightness of an image can be reduced. Consequently, visibility of an image on the display 41 can be improved.

The video camera 100 includes the viewfinder 3 and the camera body 1 to which the viewfinder 3 is attached.

According to the foregoing configuration, even if the zoom magnification is changed after diopter adjustment, the change in diopter can be reduced. As a result, the video camera 100 including the viewfinder 3 having high operability can be provided.

The viewfinder 3 further includes the diopter ring (operating part) 104 configured to rotate the adjustment frame 91. The anti-rotation pin (anti-rotation part) 105 configured to restrict rotation of the diopter ring 104 about the optical axis A2 is provided at the diopter ring 104. The anti-rotation pin 105 is configured to switch between a restriction state in which rotation of the diopter ring 104 about the optical axis A2 is restricted and a release state in which rotation of the diopter ring 104 about the optical axis A2 is allowed.

According to the foregoing configuration, erroneous operation of the diopter ring 104 can be reduced or prevented. That is, since rotation of the diopter ring 104 is restricted by the anti-rotation pin 105, the change in diopter can be reduced or prevented even if a user touches the diopter ring 104. Particularly in the configuration, such as the configuration of the viewfinder 3, in which the diopter ring 104 is disposed close to the zoom ring 102, there is a possibility that a user touches the diopter ring 104 in operation of the zoom ring 102. Even in such a configuration, since rotation of the diopter ring 104 is restricted by the anti-rotation pin 105, the erroneous change in diopter can be reduced or prevented.

The viewfinder 3 further includes the fixed ring 101 rotatably attached to the diopter ring 104. The protruding piece (engagement part) 131 engaging the anti-rotation pin 105 is provided at the fixed ring 101. The anti-rotation pin 105 is, by the coil spring (biasing part) 155, outwardly biased in the radial direction about the optical axis A2. In the restriction state, the anti-rotation pin 105 is outwardly biased in the radial direction by the coil spring 155 to engage with the protruding piece 131, thereby restricting rotation of the diopter ring 104. In the release state, the anti-rotation pin 105 is inwardly moved in the radial direction against biasing force of the coil spring 155 to disengage from the protruding piece 131, thereby allowing rotation of the diopter ring 104.

According to the foregoing configuration, the anti-rotation pin 105 is, by the simple operation of pressing/releasing the anti-rotation pin 105, switchable between the restriction state of restricting rotation of the diopter ring 104 and the release state of allowing rotation of the diopter ring 104.

Other Embodiments

As described above, the foregoing embodiment has been described as an example of the technique disclosed in the present application. However, the technique according to the present disclosure is not limited to the foregoing embodiment, but are also applicable to those where modifications, substitutions, additions, and omissions are made. In addition, elements described in the foregoing embodiment may be combined to provide a different embodiment. The embodiment has been described above as an example technique of the present disclosure, in which the attached drawings and the detailed description are provided. As such, elements illustrated in the attached drawings or the detailed description may include not only essential elements for solving the problem, but also non-essential elements for solving the problem in order to illustrate such a technique. Thus, the mere fact that those non-essential elements are shown in the attached drawings or the detailed description should not be interpreted as requiring that such elements be essential.

The foregoing embodiment may have the following configurations.

The video camera 100 is an example of the imaging apparatus, and the imaging apparatus is not limited to the video camera 100. For example, the configurations of the camera body 1 and the lens barrel 2 are not limited to those described above.

The configuration of the viewfinder 3 has been set forth merely as an example. The configurations of the lenses and the frame body are not limited to those described above. For example, each of the first lens group L1 and the second lens group L2 does not necessarily include the plurality of lenses, but may include a single lens. Each of the first lens group L1 and the second lens group L2 may have negative refractive power. The third lens group L3 does not necessarily include the single lens, but may include a plurality of lenses. The third lens group L3 may have positive refractive power. Moreover, the viewfinder 3 may include a lens group(s) other than the first to third lens groups L1-L3. In addition, the third lens group L3 may be omitted from the viewfinder 3.

The guide 92 configured to define movement of the zoom frame 6 in the optical axis direction is tilted through the diopter ring 104 and the adjustment frame 91 in the viewfinder 3, but the present disclosure is not limited to such a configuration. The configuration may be employed, in which the guide 92 is directly tilted without using the diopter ring 104 and the adjustment frame 91.

In the viewfinder 3, the guide 92, i.e., the guide groove 910, is tilted in order to change the moving pattern of the zoom frame 6 in the optical axis direction during rotation of the zoom frame 6. However, the method for changing the moving pattern of the zoom frame 6 in the optical axis direction is not limited to such a method. For example, depending on diopter, the guide 92 may be replaced with another guide 92 provided with a guide groove 910 different from that of the guide 92 in shape. The diopter is unique to each user, and it is not necessary to often adjust the diopter in, e.g., the case where a user of the video camera 100 is not frequently changed. Thus, the configuration may be employed, in which the guide 92 is replaced.

The guide groove 910 is formed such that the amount of movement of the zoom frame 6 in the optical axis direction linearly changes depending on the rotation angle of the zoom frame 6, but the present disclosure is not limited to such a configuration. As long as the change in diopter during zooming can be reduced as compared to the configuration in which the position of the zoom frame 6 in the optical axis direction is not adjusted during zooming, the guide groove 910 can be formed in various shapes.

The inclination angle of the guide groove 910 with respect to the circumferential direction is adjusted in such a manner that the guide 92 is tilted about the rotary shaft 95, but the present disclosure is not limited to such a configuration. As long as the moving pattern of the zoom frame 6 in the optical axis direction during rotation of the zoom frame 6 can be changed, the guide 92 may be moved in any patterns.

Although FIG. 11 illustrates the cases where the diopter is adjusted to −3 dp, −2 dp, −1 dp, 0 dp, and +1 dp, the diopter may be more precisely adjusted. According to the foregoing configuration, since the position of the diopter ring 104 is fixed in the state in which the anti-rotation pin 105 of the diopter ring 104 engages with one of the recesses 132 of the protruding piece 131, the minimum resolution for diopter adjustment corresponds to the pitch of the recesses 132. Thus, although the diopter can be substantially continuously adjusted, the diopter can be, in a precise sense, only discretely adjusted. Thus, e.g., in the configuration in which the anti-rotation pin 105 and the protruding piece 131 are omitted and an anti-rotation mechanism is not provided at the diopter ring 104, or the configuration in which rotation of the diopter ring 104 is prevented in a method other than engagement between the anti-rotation pin 105 and the protruding piece 131, the position of the diopter ring 104 can be continuously changed, and the diopter can be continuously adjusted. Moreover, the reference diopter is not limited to −1 dp, but may be another value such as 0 dp.

The viewfinder 3 may be configured such that the diopter is adjustable only to three values for diopter, i.e., the reference diopter, a value closer to the near-sighted side relative to the reference diopter, and a value closer to the far-sighted side relative to the reference diopter. For example, the configuration may be employed, in which the position (inclination angle) of the guide 92 is adjusted to three levels. In such a configuration, it is not necessary that the guide 92 can be continuously tilted through the diopter ring 104 and the adjustment frame 91, and the configuration of the diopter adjuster 9 can be simplified. Note that the adjustable diopter level is not limited to three levels, but may be two levels or four or more levels. In any cases, the configuration of the viewfinder 3 can be more simplified as compared to the configuration in which the diopter is substantially continuously adjustable.

As described above, the present disclosure is useful for the viewfinder and the imaging apparatus including the viewfinder.

What is claimed is:

1. A viewfinder comprising:
a finder optical system including lenses arranged on an optical axis; and
a diopter adjuster configured to adjust diopter of the finder optical system, wherein
the diopter adjuster includes
an adjustment frame
connected with the lenses, and
configured to rotate about the optical axis to move the lenses in an optical axis direction,
a diopter operating part
configured to rotate about the optical axis and
connected with the adjustment frame, and
an anti-rotation part
provided on the diopter operating part and
configured to restrict rotation of the diopter operating part about the optical axis, and
the anti-rotation part is configured to switch between
a restriction state in which rotation of the diopter operating part about the optical axis is restricted and
a release state in which rotation of the diopter operating part about the optical axis is allowed.

2. The viewfinder of claim 1, wherein
the diopter adjuster further includes
an engagement part configured to engage with the anti-rotation part in the restriction state to restrict rotation of the anti-rotation part about the optical axis and
a biasing part configured to bias the anti-rotation part outwardly in the radial direction about the optical axis so that the anti-rotation part engages with the engagement part,
in the restriction state, the anti-rotation part is biased by the biasing part to engage with the engagement part to restrict rotation of the diopter operating part about the optical axis, and
in the release state, the anti-rotation part is inwardly moved in the radial direction about the optical axis against biasing force of the biasing part to disengage from the engagement part to allow rotation of the diopter operating part about the optical axis.

3. The viewfinder of claim 1, further comprising:
a zoom ring
aligned with the diopter operating part along the optical axis direction,
configured to rotate about the optical axis, and
configured to adjust zoom magnification of the finder optical system.

* * * * *